Figure 1:
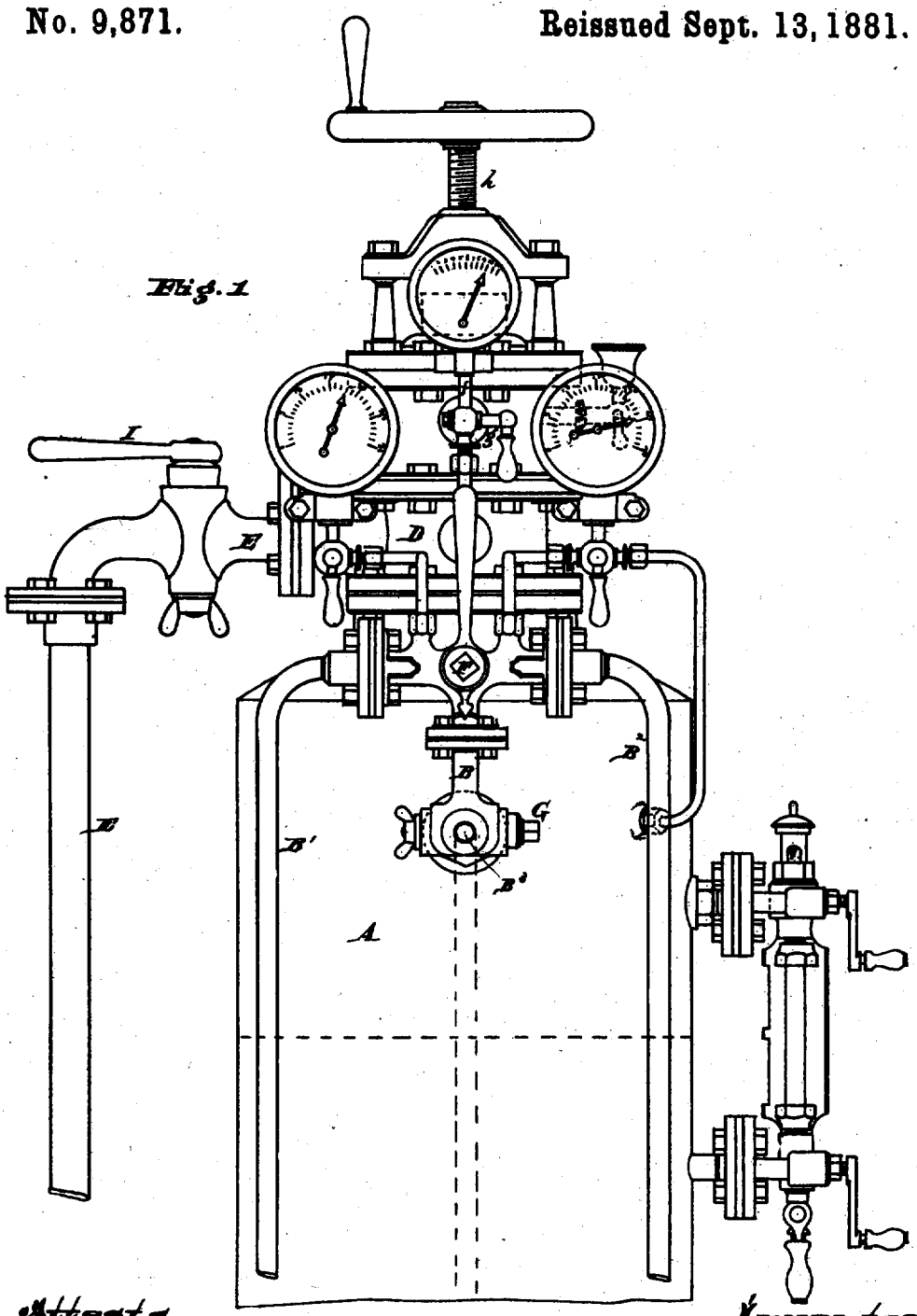

3 Sheets—Sheet 1.

L. MÉKARSKI,

Assignor to Société Generale des Moteurs a Air Comprimé

DEVICE FOR USING COMPRESSED AIR FOR MOTIVE POWER.

No. 9,871. Reissued Sept. 13, 1881.

Attest:
Max G. Colton
[illegible]

Inventor
Louis Mékarski
By his atty
[illegible]

3 Sheets—Sheet 2.

L. MÉKARSKI,

Assignor to SOCIÉTÉ GENERALE DES MOTEURS A AIR COMPRIMÉ.

DEVICE FOR USING COMPRESSED AIR FOR MOTIVE POWER.

No. 9,871. Reissued Sept. 13, 1881.

Witnesses
Wm. L. Cutting
[illegible]

Inventor
Louis Mékarski
By his atty
[illegible]

3 Sheets—Sheet 3.

L. MÉKARSKI,

Assignor to Société Générale des Moteurs à Air Comprimé.

DEVICE FOR USING COMPRESSED AIR FOR MOTIVE POWER.

No. 9,871. Reissued Sept. 13, 1881.

Witnesses
Wm. G. Button
[illegible]

Inventor
Louis Mékarski
By his atty.
[illegible]

UNITED STATES PATENT OFFICE.

LOUIS MÉKARSKI, OF PARIS, FRANCE, ASSIGNOR TO SOCIÉTÉ GÉNÉRALE DES MOTEURS Á AIR COMPRIMÉ, OF SAME PLACE.

DEVICE FOR USING COMPRESSED AIR FOR MOTIVE POWER.

SPECIFICATION forming part of Reissued Letters Patent No. 9,871, dated September 13, 1881.

Original No. 177,736, dated May 23, 1876. Reissue No. 8,683, dated April 22, 1879. Application for reissue filed August 11, 1881.

*To all whom it may concern:*

Be it known that I, LOUIS MÉKARSKI, of Paris, France, have invented a new and Improved Apparatus for Using Compressed Air for Motive Power, of which the following is a specification.

My invention has particular reference to compressed-air motors or tram-cars; and it consists in providing a motor or tram-car with air-reservoirs, into which air is forced under high pressure, and from which it is passed through a body of heated water having a high temperature, and after which it is passed into the cylinders; further, in means arranged between the compressed-air reservoirs and the cylinders to regulate the pressure of the compressed air prior to its passage into said cylinders; and, finally, in providing two sets of air-reservoirs to the motor, one of which is adapted to be used as a reserve for ascending steep gradients, &c., all of which will be more fully set forth in the following specification and shown in the accompanying sheets of drawings.

Heretofore compressed-air motors have been propelled by passing air under pressure from the compressed-air reservoirs directly into the cylinders, or said compressed air has been superheated to increase its tension prior to its admission to the cylinders; but in these cases the air cannot be used under very high pressure, as it is impossible to keep the cylinder and joints air-tight, and lubrication cannot be effected. Compressed air directly from a compressor or air-pump has also been heated and then forced into a steam-boiler through an injector along with the heated water in the boiler, which is sucked from below the water-line and forced, in company with the heated air, into the boiler above the water-line, thereby keeping up a constant circulation of the water in said boiler, as set forth in the patent to Bollinger, No. 148,658, of 1874; but in that case the apparatus is not designed as a motor or tram-car, the quantity of air to the steam was small, air at a high temperature is forced into the boiler, no reservoirs containing stored compressed air under high tension are used, and there is no automatic means to keep the pressure of the compressed air and steam at a uniform pressure as it enters the cylinders, or vary said pressure at will.

In my improvement I pass compressed air in a cold condition from a storage-reservoir, in which there is a gradually-decreasing pressure through a body of heated water, whereby said air is increased in tension due to its expansion by the heat imparted to it by said heated water, and passes, mixed with steam, into the cylinders under a substantially constant pressure. The compressed air is admitted to the heater at the bottom and passes up through a large volume of heated water in a continuous process. By this means I impart to the compressed air a degree of tension and elasticity which, united with the increase of temperature, renders the air much more useful for motive power than it would otherwise be, for the tension of the steam in the heater or reservoir is fully utilized in conjunction with that of the air.

Previous to my invention no self-propelling motor or tram-car has been furnished with means for passing compressed air stored in reservoirs under high pressure through a body of heated water, heated intermittently or continuously, before it passes to the cylinders. Neither has such a motor or tram-car been provided with self-regulating means to regulate the pressure of the compressed air and steam admitted to the cylinders, and keep said pressure practically constant or varied at will, and the pressure of which air and steam is independent of the pressure of the compressed air in the air-reservoirs. An additional advantage of this joint use of steam and compressed air is that it renders the pistons, valves, and other moving parts of the apparatus in direct contact with said compressed air properly tight by the water condensing thereon.

Although capable of general application, this invention has chiefly for its object to render practicable the employment of compressed air for locomotives and for other purposes where it is necessary to utilize in the best manner possible a limited supply of air inclosed under high pressure in a reservoir and removable only at certain interval.

The said invention comprises also an automatic distributing apparatus, which I term a "discharge-regulator," for distributing the air which flows from a reservoir where the pressure changes in decreasing to a fixed pressure lower than that of the reservoir, but which can be caused to vary instantaneously within certain wide limits, so that I can proportion at any moment the power of the engine to the resistance it has to overcome.

In respect to the construction of said automatic and adjustable regulator the invention consists in combining and connecting the valve which leads from the heater into the supply-chamber with the lower side of a flexible diaphragm, and with it the valve is exposed to the action of a spring. This arrangement serves to automatically balance the diaphragm and with it the valve, and additional pressure is exerted above the diaphragm by an adjustable piston, which can be moved up or down by hand, and serves to compress the air which acts as a spring above the diaphragm to a suitable greater degree than it is below the same.

The invention also consists in interposing a water-cushion between said diaphragm and the compressed air above the same and between the said diaphragm and said piston, to prevent leakage.

The heater can be as above described—that is to say, filled with hot water and steam at intervals, and which cools in proportion to its work, or heated continuously by any suitable means and filled with water to the proper height.

The regulator hereinafter described may either be placed between the heater and the cylinders or between the heater and reservoirs, so that the latter will be between the regulator and cylinders; but I prefer to place it, as shown in the drawings, between the heater and the cylinders.

Figure 2:
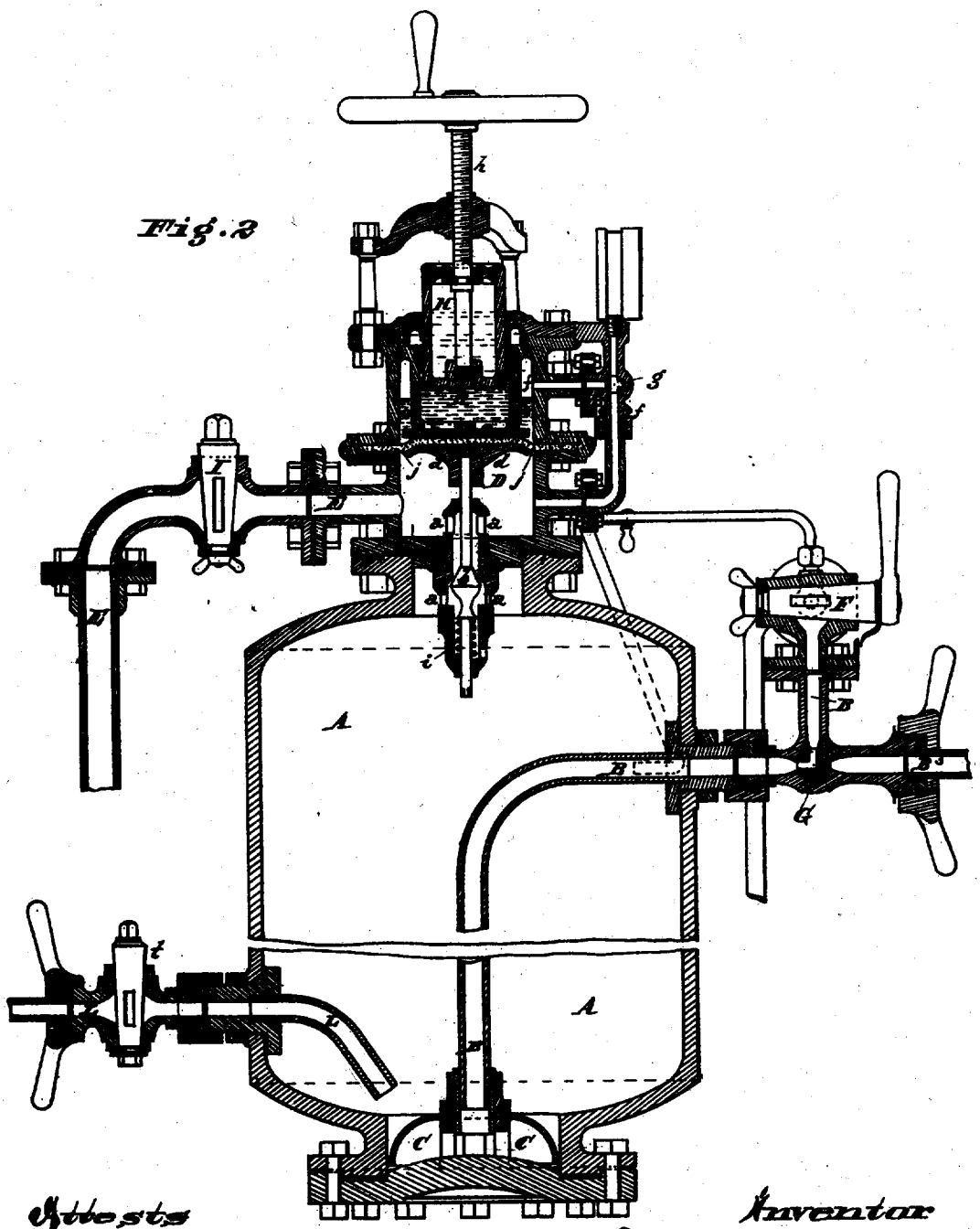
Figure 3:
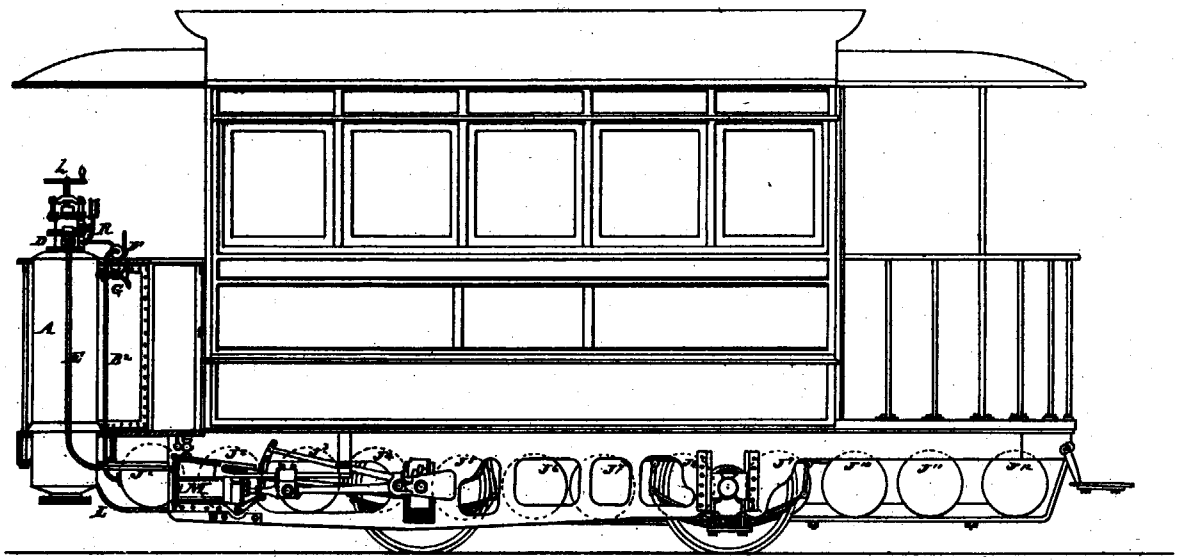

In the drawings, Figure 1 represents an elevation of my improved compressed-air apparatus. Fig. 2 is a vertical central section of same. Fig. 3 is a side elevation of a railway or tram car provided with my improved apparatus.

Similar letters of reference indicate corresponding parts in all the figures.

A represents the heater receiving the compressed air through a tube, B, which terminates in or meets a rose, C, whereby the air is divided into fine jets, which rise through the heated liquid contained in the heater A, and reunites in the heater above the water therein contained. From the heater A the compressed air enters through a pipe or orifice, *a*, into the chamber D of the regulator, and thence by a pipe, E, into the cylinders.

L is a pipe leading into the reservoir and provided with a cock, *t*. This pipe L serves to supply the heater A with the requisite amount of steam and water.

Pipe B, which connects the heater A with the compressed-air supply-tanks, as in Fig. 1, preferably branches into two pipes, $B'$ and $B^2$, and has a cock, F, at the junction, so that by said cock the heater A may be caused to communicate with either one of the two branches $B^2$ or $B^3$, and thereby with either one of two supply-tanks. That one of said tanks which for the time being is disconnected from the heater A serves as a reserve, and may be recharged while the other is in operation. By another cock, G, in the unbranched part of the pipe B, communication with the tank is established or intercepted at will. The cock G can also be used while intercepting communication between the reservoir A and the supply-tanks to cause the latter to communicate by a pipe, $B^3$, with the pump or other air-compressing mechanism located at the station, whereby the tanks are charged.

To regulate the section of the orifice *a*, by which the air flows from the heater A into the chamber D, a valve or slide, *b*, is employed, whose seat is in the pipe or orifice *a* and whose stem is connected with a movable partition or piston, *d*. This partition or piston is on one side subject to the pressure of the air in the chamber D and on the other (upper) side to a spring whose tension is determined arbitrarily. The said spring consists of a certain quantity of compressed air inclosed in the place *e*, above the partition or piston *d*, and conducted thither by a pipe, *f*, which leads from the chamber D into the space *e*, as shown in Fig. 2. A cock, *g*, is placed in the tube *f* to enable the closing of the same and the confinement within the space *e* of a certain desired quantity of the air having a certain tension. The cock *g* may be a three-way cock, to supply also a suitable gage.

The pressure of the air in the space or chamber *e* is arbitrarily regulated by the movement of a piston, H, which can be moved up or down by a suitable screw, *h*, and which fits closely into an opening in the chamber *e*. When lowered the piston H compresses the air in the chamber *e* to any tension desired, said compressed air tending to lower the partition *d* and force the valve *b* off its seat to allow the escape of compressed air and steam from heater A to chamber D. The pressure of the air in heater A and chamber D tends to close the valve *b*. Hence by the proper adjustment of the plunger H the upward and downward thrust of the valve *b* may be balanced, and any variation of the pressure in the chamber D, which communicates with the cylinders by pipe E, and by a distributing-cock, I, placed in said pipe, will cause said valve to vibrate and thereby admit fresh compressed air and steam to the cylinders, said air and steam being admitted under any pressure arbitrarily controlled through the agency of the piston or plunger H and its surrounding compressed-air cushion. The valve *b* follows automatically the variations of the discharge, closing completely the orifice *a* whenever the discharge ceases.

To insure the closing of the valve *b* during the filling of the heater A, I apply to it a small spring, *i*, which crowds it against its seat unless the partition *d* moves it off said seat.

In order to insure a proper separation of the chambers D and *e*, I place the partition or piston *d* against an india-rubber diaphragm, *j*, which is interposed between said chambers, as shown in Fig. 2.

Finally, to prevent the leakages which may be produced through the packing traversed by piston H the said piston is only made to act indirectly upon the air-spring by means of an interposed cushion of water, which it causes to flow in the annular chamber *e*. This water, which fills the central space wherein the piston moves when the latter is at the top of its stroke, is admitted by a suitable funnel.

By this intervention I provide a motor which does not present any of the inconveniences accompanying the employment of steam, and may be applied advantageously to a great number of operations, especially to the working of railways in towns and upon roads, for the interior service of mines, or for traversing long tunnels.

The capability of augmenting instantaneously the power of the engine in varying either the pressure, the expansion, or both together, will render these vehicles capable of ascending the steepest gradients. The division of the tank into two parts, whereof one forms the reserve, permits also the reservation of this available force to the last moment.

The most important result of this invention is the possibility of storing air in the carriages or tram-cars at a very high pressure, (thirty-five atmospheres or higher,) permitting a long journey without recharging the reservoirs. Nevertheless, in certain cases where it is desirable to reduce the dead-weight in diminishing the number or size of the reservoirs the charging may be effected more frequently by means of supplies of air arranged along the road at suitable distances and attached to tubes or passages fed by the compressing-works.

For the illustration of the application of the preceding, I show in Fig. 3, as an example, the general arrangement of a type of self-moving carriages or tram-cars constructed according to this invention.

$J'$ $J^2$ $J^3$, &c., are the tanks of air placed under the frame. $J'$ and $J^2$ compose the reserve, the others the main store.

A is the heater, whose details are shown in Figs. 1 and 2. This apparatus is placed at the front of the carriage upon the first platform.

R is the regulator.

M is the motor mechanism, fixed laterally at each side of the frame upon sleepers of plate-iron or other suitable metal properly mounted and placed in front of the driving-axle to effect an equilibrium to the load of the passengers gathered upon the rear platform. The body of the car is adapted to receive the passengers. The front platform is reserved for the engineer, and the rear one is for passengers to stand upon.

I am aware of the English Patent No. 10,867 of 1845, and do not claim anything therein shown or set forth.

Having now described my invention, what I claim as new, and desire to secure by Letters Patent, is—

1. The combination of the air-heater A with the air-supply pipe B and with the steam-supply pipe L, the air-heater constituting also a water-receptacle, substantially as herein shown and described.

2. The combination of the air-heater A and pipe B with the branch pipes $B'$ and $B^2$ and cocks F and G, substantially as and for the purpose specified.

3. The combination of the pipe $B^3$ and cock G with the pipe B, reservoir A, and branch pipes $B'$ and $B^2$, substantially as and for the purpose specified.

4. The combination of the chamber D with its inlet-valve *b* and with the movable partition or piston *d*, which is subjected on one side to the pressure of the air in the chamber D and on the other side to a spring whose tension is arbitrarily adjusted, substantially as and for the purpose specified.

5. The combination of the chamber D and movable partition or piston *d* with the chamber *e* and with the connecting-pipe *f*, substantially as and for the purpose specified.

6. The combination of the chamber D and movable partition *d* with the chamber *e*, connecting-pipe *f*, and cock *g*, substantially as and for the purpose specified.

7. The piston H, combined with the chamber *e*, movable partition *d*, chamber D, and valve *b*, substantially as and for the purpose specified.

8. The combination of the chamber D and valve *b* with the flexible diaphragm *j* and upper chamber, *e*, substantially as and for the purpose specified.

9. The combination of the valve *b*, spring *i*, and partition *d* with the piston H and chambers D and *e*, substantially as and for the purpose specified.

10. The combination of the piston H, air-chamber *e*, and movable partition *d*, and the diaphragm with the water-cushion interposed between said piston and the compressed air in said chamber, substantially as and for the purpose specified.

11. The regulator consisting of the combination of the piston H, casing having an annular air-chamber, *e*, the diaphragm *j*, and the valve *b*, supported by a spring, *i*, substantially as and for the purpose specified.

12. The combination, with the hot-water receptacle, of one or more reservoirs in connection with said receptacle, by means of a pipe terminating in a rose, and a regulator to control the pressure of the air and steam as it passes to the cylinders, the whole being arranged upon wheels and adapted to be propelled on a tramway or railroad, as and for the purpose specified.

13. In a compressed-air locomotive, two separate and independent sets of reservoirs, in combination with a heater containing hot water, pipes connecting said reservoirs with the heater, and a valve to admit the compressed air from either one or both of said reservoirs at one time and pass it through the heated water, as and for the purpose specified.

14. In a self-propelling compressed-air locomotive or tram-car, a frame supported upon wheels adapted to be rotated by engines, in combination with storage tanks or reservoirs arranged upon said motor, a hot-water receptacle or heater adapted to contain water at a high temperature, means communicating with said reservoirs and heater to cause the compressed air in said reservoirs to pass through said heated water before its admission to the engines, substantially as and for the purpose specified.

15. In a self-propelling compressed-air motor or tram-car, a frame or truck supported upon wheels adapted to be rotated by engines, in combination with storage tanks or reservoirs arranged upon said motor, a hot-water receptacle or heater adapted to contain water at a high temperature, a pipe or its equivalent connecting said reservoirs with the heater to cause the compressed air in said reservoirs to pass through the heated water before its admission to the engines, and means to automatically regulate the pressure of the compressed air and steam before passing to the engines, substantially as and for the purpose specified.

16. The herein-described process of generating a motive force for self-propelling locomotives or tram-cars, which consists in passing compressed air in the cold state and under high pressure through a body of heated water, whereby the tension of the compressed air is increased, and steam mixed or incorporated with said compressed air at a single operation, substantially as and for the purpose specified.

17. The herein-described method for generating and controlling a motive force for self-propelling locomotives and tram-cars, consisting in passing compressed air in the cold state and having a gradually-decreasing pressure through a body of heated water, thereby increasing its tension and mixing with said compressed air some steam, and finally passing said compressed air and steam under a reduced and substantially constant pressure into the motor, whereby said cold compressed air is increased in tension, combined with steam to lubricate the working parts of the motor, and the duration of duty of a given quantity of compressed air is greatly lengthened, substantially as and for the purpose specified.

In testimony of which invention I hereunto set my hand.

LOUIS MÉKARSKI.

Witnesses:
JULIEN,
L. MONNIER.